United States Patent [19]

Nagasawa et al.

[11] 4,104,455

[45] Aug. 1, 1978

[54] POLYMERIZATION OF MONOMER

[75] Inventors: Mitsuru Nagasawa, Nagoya; Teruo Fujimoto, Chiryu; Kazuo Tago, Tokuyama, all of Japan

[73] Assignee: Toyo Soda Manufacturing Co., Ltd., Japan

[21] Appl. No.: 783,003

[22] Filed: Mar. 30, 1977

Related U.S. Application Data

[63] Continuation-in-part of Ser. No. 614,777, Sep. 19, 1975, abandoned.

[30] Foreign Application Priority Data

Mar. 25, 1975 [JP] Japan .................................. 50-34950

[51] Int. Cl.$^2$ ............................ C08F 4/46; C08F 4/48; C08F 4/50
[52] U.S. Cl. ..................................... 526/173; 526/86; 526/181; 526/183
[58] Field of Search .................. 526/173, 86, 181, 183

[56] References Cited

U.S. PATENT DOCUMENTS

| | | | |
|---|---|---|---|
| 3,215,679 | 11/1965 | Tvepka .............................. | 526/173 |
| 3,265,680 | 8/1966 | Forman et al. ...................... | 526/173 |
| 3,276,843 | 10/1966 | Cooper ................................ | 23/230 |
| 3,312,680 | 4/1967 | Kahle ................................... | 526/173 |
| 3,862,097 | 1/1975 | Milkovich et al. .................. | 526/173 |

Primary Examiner—William F. Hamrock
Attorney, Agent, or Firm—Oblon, Fisher, Spivak, McClelland & Maier

[57] ABSTRACT

In the polymerization of an anionically polymerizable monomer using a polymerization system comprising a monomer and a polymerization solvent wherein an organometallic compound polymerization initiator, soluble in said polymerization system and having the formula:

$$MeR_x$$

wherein Me is a metal selected from the group consisting of Groups I and II of the Periodic Table; R represents an alkyl or aryl group, or an aliphatic or aromatic hydrocarbon residue; and the integer $x$ is 1 or 2; is added to said system, the improvement which comprises adding said organometallic compound as a solution comprising said organometallic compound dissolved in a high viscosity solvent having a viscosity higher than 1 cp at room temperature, and which dissolves slowly in said polymerization system.

6 Claims, 1 Drawing Figure

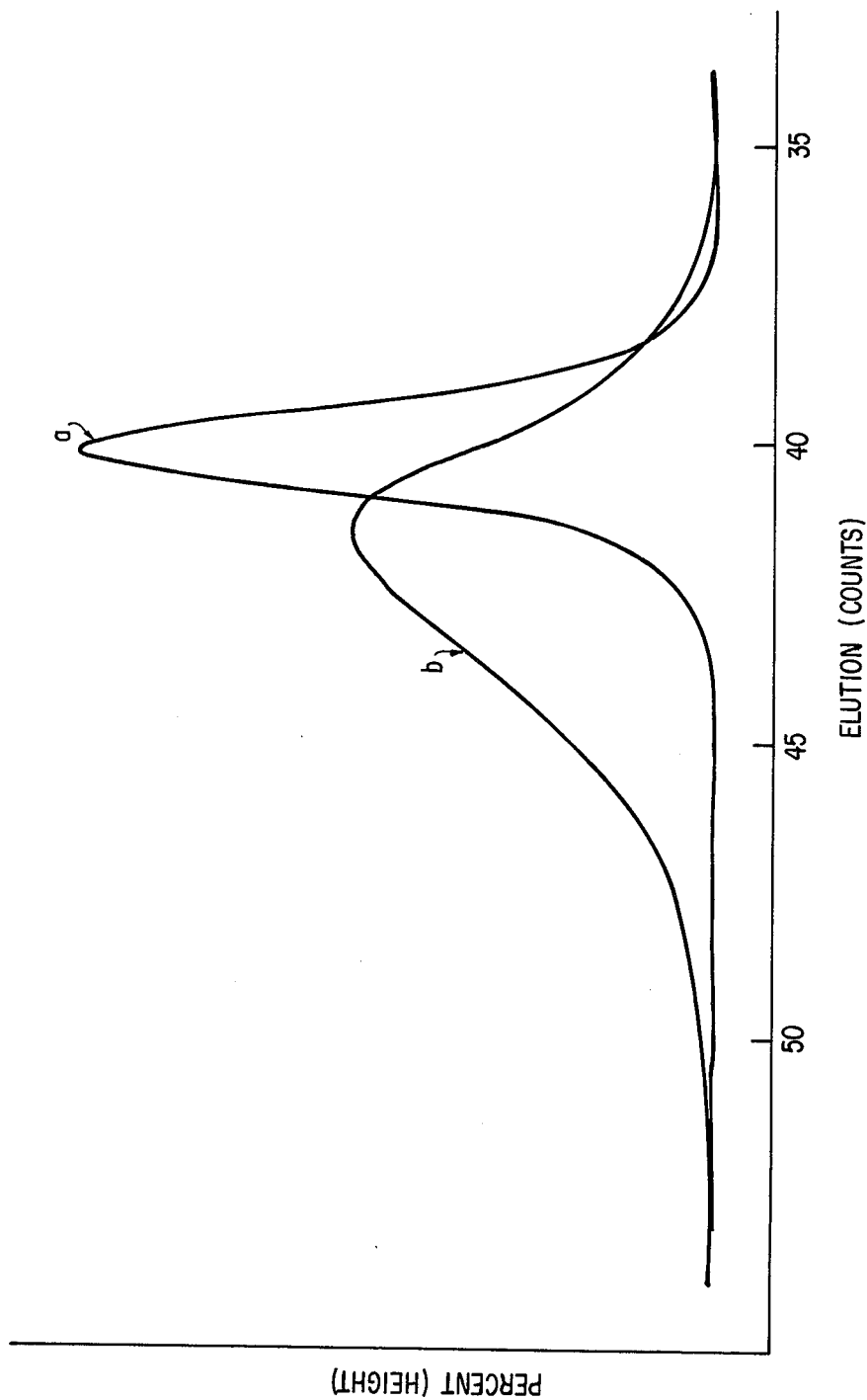

POLYMERIZATION OF MONOMER

This application is a continuation in part of Ser. No. 614,777, filed Sept. 19, 1975, now abandoned.

BACKGROUND OF THE INVENTION:

1. Field of the Invention

The present invention relates to an improvement in polymerizations used to produce polymers having a narrow molecular weight distribution which are used as standard materials for measuring the average molecular weight or molecular weight distribution or other polymers.

2. Description of the Prior Art:

In general, the processability and mechanical properties of synthetic resins and synthetic rubbers produced in the high-polymer chemical industries are determined by the molecular characteristics of the polymers of interest, especially the average molecular weight and the molecular weight distribution of the polymers. Accordingly, it is quite important to be able to accurately measure these properties. It has been known that gel permeation chromatography (hereinafter, referred to as GPC) and ultracentrifugation can be employed for simultaneously measuring the average molecular weight and the molecular weight distribution of a polymer. However, fully suitable standard materials for use in these measurements do not exist, and as a result the development of such standard materials is required. More specifically, a series of standard materials having a quite narrow molecular weight distribution over a wide range of molecular weights from $10^3$–$10^7$, preferably $10^2$–$10^8$, is required.

In the past, polystyrenes produced by conventional living anionic polymerization have been used as standard materials. However, the molecular weight distribution of these polymers is insufficiently narrow. Especially in the region of molecular weights greater than $10^6$, it is difficult to produce a polymer having a value of $M_w/M_n$ of less than 1.10. $M_w/M_n$ is the ratio of the weight average molecular weight ($M_w$) to the number average molecular weight ($M_n$). Consequently, there has been a need to develop a polymerization method for producing polymers having such a narrow molecular weight distribution in the aforementioned molecular weight region. (Hereinafter, these will be referred to as polymers having a narrow molecular weight distribution, i.e., having a value of $M_w/M_n$ of less than 1.10.)

Heretofore, attempts to produce polymers having such a narrow molecular weight distribution have been based on achieving the following conditions:

(1) The rate of initiation of the reaction in the polymerization is much higher than the rate of propagation of the reaction;

(2) Impurities such as water, oxygen, carbon dioxide, and the like which deactivate the active anions are carefully excluded from the polymerization system; and (3) The monomer and the polymerization initiator are uniformly dissolved in the polymerization system before the initiation of the polymerization reaction. However, for example, in the anionic polymerization of styrene, it is difficult to completely remove the impurities from the monomer as prescribed by the second condition. It is also difficult to attain the third condition because of the extremely high rate of polymerization included in the conventional anionic polymerization reaction. Also, establishing the second condition requires an exceptionally long period of time and a large amount of work in order to suitably purify the solvent for polymerization and the monomer. The results of establishing the third condition are also unsatisfactory. Consequently, there continues to exist a need for a satisfactory polymerization method for producing polymers having a narrow molecular weight distribution.

SUMMARY OF THE INVENTION

Accordingly, it is an object of this invention to provide a polymerization method for producing a polymer having a narrow molecular weight distribution.

Briefly, this and other objects of this invention, as will hereinafter become clear by the ensuing discussion, have been attained by providing a method for polymerization of an anionically polymerizable monomer which comprises adding to the polymerization system of the monomer and the solvent used for the polymerization a polymerization initiator which is a solution of an organometallic compound dissolved in a high viscosity solvent which dissolves slowly in the solvent used for the polymerization.

BRIEF DESCRIPTION OF THE DRAWING

A more complete appreciation of the invention and many of the attendant advantages thereof will be readily attained as the same becomes better understood by reference to the following detailed description when considered in connection with the accompanying Drawings, wherein:

FIG. 1 shows the elution curves from gel permeation chromatography on a product of this invention (a) and a conventional product (b).

DETAILED DESCRIPTION OF THE PREFERRED EMBODIMENTS

In the method of polymerization of this invention, the solution of the initiator dissolved in the high viscosity solvent which dissolves slowly in the solvent used for the polymerization may be added dropwise to the polymerization system of the monomer and the solvent for polymerization with stirring to disperse the drop. That is, the drop of the solution of initiator first reacts with the impurities in the reaction system, such as water, oxygen, carbon dioxide, and the like, before being uniformly dissolved into the reaction system. Thereafter, the polymerization reaction is gradually initiated as the initiator becomes uniformly dissolved, whereby the above-mentioned conditions (2) and (3) are realized enabling the production of a polymer having a narrow molecular weight distribution. Moreover, in accordance with the polymerization method of this invention, the molecular weight of the resulting polymer can be easily controlled by controlling the rate of addition and the concentration of the solution of the initiator. Accordingly, polymers having a narrow molecular weight distribution over a wide range of molecular weights from $10^2$–$10^8$ can be produced. The resulting polymers can be used as standard materials for measuring molecular weights and molecular weight distributions of other polymers employing gel permeation chromatography and ultracentrifugal sedimentation. They can also be used as standard materials in the molecular weight measuring apparatus used in the light scattering and the osmotic pressure methods. Additionally, they can serve as standard reference materials for general use in scientific studies on high polymers such as studies of the effect of the molecular weight or the molecular weight distribution on solution properties, rheological properties and/or solid-state properties.

Using the method of polymerization of this invention, it is possible to remove all of the impurities present in the polymerization system before initiation of the polymerization reaction. Accordingly, polymers having narrow molecular weight distributions equal to those of polymers produced by polymerizing monomers only after extensive purification of the solvent and the monomer, can be obtained without such extensive purification treatments. As a result, the polymerization method of this invention can be readily applied to large-scale anionic polymerizations and can also be applied to the industrial scale block co-polymerization of thermoplastic rubbers having narrow molecular weight distributions. Heretofore, this has been considered to be impossible.

The polymerization method of this invention is applicable to all anionically polymerizable monomers. Suitable anionically polymerizable monomers include aromatic vinyl compounds such as styrene, α-methylstyrene, halogenated styrene, vinyl-naphthalene, and the like; heterocyclic vinyl compounds such as vinylpyridine and the like; other vinyl compounds such as esters of acrylic acid, methacrylic acid and crotonic acid or acrylonitrile, methacrylonitrile, and the like; diene compounds such as butadiene, isoprene, and the like; and oxide compounds such as ethylene oxide, propylene oxide, and the like. These monomers are generally dehydrated by a suitable dehydrating agent in an inert gas flow or in vacuum, and then are distilled to prepare them for use in the polymerization reaction. The solvents used for the polymerization are not critical as long as the anionic polymerization is not inhibited. Preferably, they are solvents which dissolve the resulting polymers. Suitable solvents include those conventionally used in anionic polymerizations such as aromatic and aliphatic hydrocarbons such as benzene, toluene, hexane, heptane, and the like; and cyclic ethers such as tetrahydrofuran, dioxane and the like. These solvents are dehydrated and then distilled as in the case of the monomers in order to prepare them for use as solvents for the polymerization reaction.

Suitable organometallic polymerization initiators which are to be dissolved in the high viscosity solvent which dissolves slowly in the solvent used for the polymerization are those having the formula:

$$M_e R_x$$

wherein $M_e$ is a metal from Groups I and II of the Periodic Table, such as Li, Na, K, Cs, Be, Mg and the like; R is an alkyl or aryl group or an aliphatic or aromatic hydrocarbon residue; and the integer $x$ is 1 or 2. Suitable alkyl groups are the $C_{1-10}$ lower alkyl groups. Suitable aryl groups are the phenyl, biphenyl, alkylphenyl and the like. Suitable organometallic compounds include butyllithium; phenylisopropyl potassium, sodium anthracene, sodium biphenyl, α-methylstyrene potassium, diethylberyllium, diphenylmagnesium and the like. Suitable solvents for the organometallic compounds are those having a viscosity higher than 1 cp, preferably higher than 2 cp, at room temperature which do not inhibit the anionic polymerization. It is preferred to use aromatic and aliphatic hydrocarbons which dissolve slowly in the solvent for polymerization. Suitable solvents include hexylbenzene, decalin, 1,2,3,4-tetrahydronaphthalene, liquid paraffin and mixtures thereof. It is possible to prepare a solution of the polymerization initiator in a high viscosity solvent for use in this invention by the following method, wherein is used a solution of the organometallic compound dissolved in a low viscosity solvent having a viscosity of less than 1 cp at room temperature. A high viscosity solvent which is purified by degassing and dehydration in vacuum is mixed with the solution of the polymerization initiator in a low viscosity solvent. Thereafter, the low viscosity solvent is removed by vacuum distillation, whereby a solution of the polymerization initiator in the high viscosity solvent at a concentration of from 10 to $10^{-7}$ mole/l is produced.

The polymerization of the invention can be conducted by dropwise addition of the solution of the polymerization initiator in the high viscosity solvent to the polymerization system of the monomer and the solvent used for the polymerization while stirring in vacuum or in an inert gas flow using a vacuum bullet and the like until the polymerization is initiated. The concentration to be used can be determined by conventional considerations according to the desired molecular weight for the resultant polymer and the concentration of impurities in the system. The concentration of the monomer in the reaction mixture is preferably in the range of 0.5–20% depending upon the molecular weight desired for the object polymer. The temperature for polymerization is not critical but is preferably lower than 50° C.

Having generally described the invention, a more complete understanding can be obtained by reference to certain specific Examples, which are provided for purposes of illustration only and are not intended to be limiting unless otherwise specified.

EXAMPLE 1

In a reactor having a reduced pressure of $10^{-5}$ mmHg was charged 2.0 l of tetrahydrofuran (which was purified by removing impurities with a sodium vapor-deposited mirror and sodium anthracene and distilling under reduced pressure) and 15 g of styrene (which was purified by mixing with calcium hydride and distilling, and mixing with a solution of triphenylmethyl sodium in diethylene glycol dimethyl ether and distilling under reduced pressure before the polymerization). The content of the reactor was cooled to −78° C with a solid carbon dioxide bath (dry ice-methanol mixture). 2 ml of a solution of n-butyl lithium in a high viscosity solvent of n-hexylbenzene (having a viscosity of 2.1 cp at room temperature and a concentration of $5.5 \times 10^{-6}$ mole/ml) was added dropwise to the reactor with stirring. After the addition, the polymerization was conducted for 40 minutes with stirring and a solution of n-butanol in toluene was added to stop the polymerization.

The results of the polymerization were as follows:

| | |
|---|---|
| Yield | 100% |
| Weight average molecular weight | |
| $M_w$ | $6.5 \times 10^6$ |
| $M_w/M_n$ | 1.01 |
| Intrinsic viscosity [η] | 2.25 dl/g. |

Sharp sediment boundaries were found in the Schlielen pattern of the ultracentrifugal sedimentation of polystyrene in cyclohexane at concentrations of $5.0 \times 10^{-4}$ and $9.4 \times 10^{-4}$ g/ml at 34.5° C, using a speed of rotation of 29,500 rpm, 45 minutes after the initiation. The weight average molecular weight $M_w$ was measured by the light scattering method using trans-decalin and benzene as solvents. The value of $M_w/M_n$ was measured by GPC measurement using a solvent of butanone. The intrinsic viscosity was measured at 34.5° C in cyclohexane. The same measurements were employed in the following examples unless otherwise specified.

REFERENCE EXAMPLE 1

Polymerization of styrene is tetrahydrofuran was conducted by the conventional anionic polymerization method. The resulting polystyrene was compared to that of Example 1. The tetrahydrofuran and styrene were purified by the methods of Example 1. A solution of n-butyllithium in a low viscosity n-hexane solvent (viscosity of 0.29 cp at room temperature and concentration of $5.5 \times 10^{-6}$ mole/ml) was used as a polymerization initiator. The polymerization was conducted by charging 2.0 l of tetrahydrofuran and 2.7 ml of the solution of the polymerization initiator in a reactor under a reduced pressure of $10^{-5}$ mmHg and cooling to $-78°$ C and adding 15 g of styrene with stirring.

The results of the polymerization were as follows:

| Yield | 100% |
| --- | --- |
| Weight average molecular weight $M_w$ | $4.8 \times 10^6$ |
| $M_w/M_n$ | 1.28 |
| Intrinsic viscosity $[\eta]$ | 1.82 dl/g. |

FIG. 1 shows the elution curves $a$ and $b$ of a gel permeation chromatograph using the polystyrenes produced in Example 1 and Reference 1, respectively. As can be seen, production of polystyrene having a narrow molecular weight distribution was not successful using the conventional method. However, in accordance with the polymerization of this invention, polystyrene having a quite narrow molecular weight distribution was obtained.

EXAMPLES 2-8

The polymerization of Example 1 was repeated except for varying the proportions among the tetrahydrofuran solvent, the styrene monomer and the polymerization initiator of n-butyllithium charged into the system and for varying the type of the high viscosity solvent used for the polymerization initiator. The results and conditions used are shown in Table I together with the results of Example 1. As is clear from Table I, in accordance with the polymerization method of this invention, polystyrene having a narrow distribution of molecular weight can be produced in a wide range of molecular weights.

REFERENCE EXAMPLES 2-7

The conventional anionic polymerization of Reference 1 was repeated except for varying the proportions among the tetrahydrofuran solvent, the styrene monomer and the n-butyllithium polymerization initiator, and for varying the type of the low viscosity solvent used for the polymerization initiator. The results and conditions used are shown in Table II together with the result of Reference 1.

EXAMPLES 9-13

The polymerization of Example 1 was repeated except for using benzene as the solvent for polymerization, and for using isoprene as the monomer and using different initiators. Benzene was purified by the method for purifying tetrahydrofuran as in Example 1. Isoprene was purified by using a sodium vapor-deposited mirror and a sodium-potassium alloy. The polymerization initiators were solutions of sec-butyl lithium in various high viscosity solvents. The polymerizations were conducted at 35° C for 2 hours. The results of the polymerizations using various proportions among the charged components are shown in Table III. The weight average molecular weight $M_w$ and $M_w/M_n$ were measured by the light scattering and the gel permeation chromatography methods using tetrahydrofuran as the solvent. In accordance with the polymerization of the invention, polyisoprene having a narrow molecular weight distribution was obtained in a wide range of molecular weights.

EXAMPLE 14

A block copolymer was produced by using isoprene and tert-butyl crotonate. Isoprene was purified in accordance with the method of Example 9. The solvent of tetrahydrofuran was purified in accordance with the process of Example 1. Tert-butyl crotonate was purified by dehydrating with a calcium hydride and sodium vapor-deposited mirror and mixing with a solution of n-butyl lithium in n-hexyl benzene and distilling under reduced pressure. A solution of sec-butyllithium is a high viscosity solvent of n-hexylbenzene (concentration of $3.0 \times 10^{-5}$ mole/ml) was used as the polymerization initiator. In accordance with the process of Examples 9-13, isoprene was polymerized at $-78°$ C and then a 20% solution of tert-butyl crotonate in tetrahydrofuran was charged into the reaction system and the polymerization was conducted for 10 hours. In the polymerization, 1.0 l of tetrahydrofuran, 9.0 g of isoprene, 20.5 g of tert-butyl crotonate, and $1.0 \times 10^{-4}$ mole of sec-butyl lithium were used. The yield of the resulting AB type block copolymer was 98%. The weight fraction of the isoprene subchains was 31%. The number average molecular weight of the block copolymer measured by the osmotic pressure method using toluene was $3.2 \times 10^5$. The Schlielen pattern of the ultracentrifugal sedimentation of the block copolymer had a sharp sediment boundary showing that the block copolymer had a narrow molecular weight distribution. In accordance with the invention, a uniform composition of AB type or ABA type block copolymer can be easily produced by using monofunctional or bifunctional polymerization initiators. The method is also suitable for producing thermoplastic rubber.

EXAMPLE 15

In a gas flow of argon purified by passage through a solution of sodium anthracene in tetrahydrofuran, styrene was polymerized using a solvent of tetrahydrofuran. Tetrahydrofuran (purified by adding sodium and distilling) and styrene (distilled under reduced pressure) were charged into a reactor purged with argon under positive argon pressure. The solution of n-butyllithium in 1,2,3,4-tetrahydronaphthalene (concentration of $9.8 \times 10^{-6}$ mole/ml) of Example 8 was added dropwise to the reactor, and the polymerization was conducted at $-78°$ C for 40 minutes. In the polymerization, 2.0 l of tetrahydrofuran, 18 g of styrene and $5.4 \times 10^{-5}$ mole of n-butyllithium were used. The results of the polymerization were as follows:

| Yield | 100% |
| --- | --- |
| Weight average molecular weight $M_w$ | $3.4 \times 10^6$ |

-continued

| $M_w/M_n$ | 1.04 |
|---|---|
| Intrinsic viscosity $[\eta]$ | 1.60 dl/g |

It was found that a polymer having a narrow molecular weight distribution was produced, even though only crudely purified solvent and monomer were used. (The value of $M_w/M_n$ was slightly higher than that of the polystyrene of Example 8). Accordingly, the process of the invention can be applied to large scale anionic polymerization in an inert gas flow.

EXAMPLE 16

In accordance with the process of Example 15, methyl methacrylate was polymerized at $-78°$ C by using tetrahydrofuran as the solvent for polymerization and a solution of sodium biphenyl in n-hexylbenzene (concentration of $1.6 \times 10^{-5}$ mole/ml) as the polymerization initiator. The polymerization was conducted for 1.5 hours by using 1.5 l of the solvent, 20 g of the monomer and $8.2 \times 10^{-5}$ mole of the initiator. The results of the polymerization were as follows:

| Yield | 100% |
|---|---|
| $M_w$ | $7.8 \times 10^5$ |
| $M_w/M_n$ | 1.09 |

The value of $M_w$ and $M_w/M_n$ were measured by light scattering and gel permeation chromatography using butanone as the solvent.

EXAMPLE 17

In accordance with the process of Example 15, 4-vinylpyridine was polymerized at 45° C by using toluene as the solvent for polymerization and a solution of n-butyllithium in n-hexylbenzene (concentration of $4.2 \times 10^{-5}$ mole/ml) as the polymerization initiator. The polymerization was conducted for 5 hours by using 1.0 l. of the solvent, 35 g of the monomer and $2.4 \times 10^{-4}$ mole of the initiator. The results of the polymerization were as follows:

| Yield | 100% |
|---|---|
| $M_n$ | $2.8 \times 10^5$ |
| $M_w/M_n$ | 1.10 |

The number average molecular weight, $M_n$, was measured by the osmotic pressure method using toluene as the solvent. The value of $M_w/M_n$ was measured by gel permeation chromatography using tetrahydrofuran with 2% of pyridine added.

EXAMPLE 18

In accordance with the process of Example 15, styrene was polymerized at 40° C for 3 hours by using toluene as the solvent for polymerization and a solution of n-butyl lithium in 1,2,3,4-tetrahydronaphthalene as the polymerization initiator (concentration of $5.0 \times 10^{-5}$ mole/ml). Thereafter, methacrylonitrile (dehydrated by mixing with calcium hydride and distilling under a reduced pressure) was charged into the reactor under argon gas pressure and the polymerization was further conducted for 3 hours. In the polymerization, 1.5 l. of tetrahydrofuran, 15 g of styrene, 5 g of methacrylonitrile and $1.5 \times 10^{-4}$ mole of n-butyl lithium were used. Before charging methacrylonitrile, a part of the reaction mixture was sampled, to obtain 0.2 g of polystyrene. The values of $M_w$ and $M_w/M_n$ of the polystyrene sampled were, respectively, $1.7 \times 10^5$ and 1.08. The yield of the AB type block copolymer was 96% and the weight graction of the methacrylonitrile subchains was 29%. The elution curve of the gel permeation chromatography of the block copolymer displayed a quite narrow molecular weight distribution for the block copolymer.

Table I

| | Amounts of components charged | | | Solution of polymerization initiator | | | Yield (%) | Mw | Mw/Mn | $[\eta]$ (dl/g) |
|---|---|---|---|---|---|---|---|---|---|---|
| Example | THF (l) | S (g) | n-BuLi (mole) | Type of solvent | Viscosity (cp) | Concentration (mole/ml) | | | | |
| 1 | 2.0 | 15 | $1.1 \times 10^{-5}$ | n-HeB | 2.1 | $5.5 \times 10^{-6}$ | 100 | $6.5 \times 10^6$ | 1.01 | 2.25 |
| 2 | 2.0 | 15 | $6.6 \times 10^{-6}$ | n-HeB | 2.1 | $2.0 \times 10^{-6}$ | 100 | $1.3 \times 10^7$ | <1.01 | 3.10 |
| 3 | 2.5 | 15 | $4.2 \times 10^{-6}$ | Dec. | 2.4 | $2.0 \times 10^{-6}$ | 100 | $2.6 \times 10^7$ | 1.02 | 4.37 |
| 4 | 1.0 | 25 | $2.0 \times 10^{-4}$ | n-BuB | 1.1 | $5.0 \times 10^{-5}$ | 100 | $9.1 \times 10^4$ | 1.05 | 0.26 |
| 5 | 1.5 | 20 | $1.1 \times 10^{-4}$ | n-BuB | 1.1 | $5.0 \times 10^{-5}$ | 100 | $3.0 \times 10^5$ | 1.04 | 0.47 |
| 6 | 1.5 | 20 | $6.1 \times 10^{-5}$ | THN | 2.0 | $2.0 \times 10^{-5}$ | 100 | $5.5 \times 10^5$ | 1.02 | 0.64 |
| 7 | 1.5 | 17 | $3.6 \times 10^{-5}$ | THN | 2.0 | $2.0 \times 10^{-5}$ | 100 | $1.2 \times 10^6$ | 1.02 | 0.95 |
| 8 | 2.0 | 17 | $2.0 \times 10^{-5}$ | THN | 2.0 | $5.5 \times 10^{-6}$ | 100 | $2.6 \times 10^6$ | 1.01 | 1.40 |

THF:tetrahydrofuran
S:styrene
n-BuLi:n-butyl lithium
n-HeB:n-hexylbenzene
n-BuB:n-butylbenzene
THN:1,2,3,4-tetrahydronaphthalene
Dec.:decalin Table II

| | Amounts of components charged | | | Solution of polymerization initiator | | | Yield (%) | Mw | Mw/Mn | $[\eta]$ (dl/g) |
|---|---|---|---|---|---|---|---|---|---|---|
| Reference | THF (l) | S (g) | n-BuLi (mole) | Type of solvent | Viscosity (cp) | Concentration (mole/ml) | | | | |
| 1 | 2.0 | 15 | $1.5 \times 10^{-5}$ | n-He | 0.29 | $5.5 \times 10^{-6}$ | 100 | $4.8 \times 10^6$ | 1.28 | 1.90 |
| 2 | 1.5 | 17 | $4.1 \times 10^{-5}$ | n-He | 0.29 | $1.3 \times 10^{-5}$ | 100 | $9.8 \times 10^5$ | 1.20 | 0.80 |
| 3 | 2.0 | 15 | $1.5 \times 10^{-5}$ | n-Oc. | 0.51 | $5.5 \times 10^{-6}$ | 100 | $5.4 \times 10^6$ | 1.34 | 2.05 |
| 4 | 2.0 | 15 | $1.6 \times 10^{-5}$ | Et.B | 0.64 | $5.5 \times 10^{-6}$ | 100 | $4.5 \times 10^6$ | 1.31 | 1.85 |
| 5 | 2.0 | 15 | $1.5 \times 10^{-5}$ | i-PrB | 0.74 | $5.5 \times 10^{-6}$ | 100 | $4.3 \times 10^6$ | 1.18 | 1.81 |
| 6 | 2.0 | 15 | $1.5 \times 10^{-5}$ | CyHe | 0.90 | $5.5 \times 10^{-6}$ | 100 | $5.0 \times 10^6$ | 1.16 | 2.00 |

Table II-continued

| Reference | Amounts of components charged | | | Solution of polymerization initiator | | | Yield (%) | Mw | Mw/Mn | [η] (dl/g) |
|---|---|---|---|---|---|---|---|---|---|---|
| | THF (l) | S (g) | n-BuLi (mole) | Type of solvent | Viscosity (cp) | Concentration (mole/ml) | | | | |
| 7 | 1.5 | 17 | $3.9 \times 10^{-5}$ | CyHe | 0.90 | $1.3 \times 10^{-5}$ | 100 | $1.1 \times 10^6$ | 1.17 | 0.90 |

THF:tetrahydrofuran
S:styrene
n-BuLi:n-butyl lithium
n-He:n-hexane
n-Oc.: n-octane
Et.B.:ethylbenzene
i-PrB:iso-propylbenzene
CyHe:cyclohexane Table III

| Example | Amounts of components charged | | | Solution of polymerization initiator | | Yield (%) | Mw | Mw/Mn |
|---|---|---|---|---|---|---|---|---|
| | B (l) | I-Pre. (g) | sec-BuLi (mole) | Type of solvent | Concentration (mole/ml) | | | |
| 9 | 0.5 | 40 | $8.0 \times 10^{-3}$ | l.Par. | $3.0 \times 10^{-3}$ | 96 | — | 1.10 |
| 10 | 0.5 | 30 | $7.5 \times 10^{-4}$ | PLB | $2.2 \times 10^{-4}$ | 100 | $5.3 \times 10^4$ | 1.04 |
| 11 | 1.0 | 30 | $6.2 \times 10^{-5}$ | l.Par. | $3.0 \times 10^{-5}$ | 100 | $6.2 \times 10^5$ | 1.05 |
| 12 | 1.5 | 20 | $2.3 \times 10^{-5}$ | Dec. | $1.4 \times 10^{-5}$ | 100 | $1.1 \times 10^6$ | 1.03 |
| 13 | 1.5 | 16 | $5.8 \times 10^{-6}$ | Dec. | $2.5 \times 10^{-6}$ | 100 | $3.8 \times 10^6$ | 1.03 |

B:benzene
I-Pre.:isoprene
sec-BuLi:sec-butyl lithium
l.Par.:liquid paraffin
PLB:mixture of liquid paraffin and benzene at ratio of 2:5.
Dec.:decalin

EXAMPLE 19

To demonstrate the difference in the time required for dissolving low viscosity and high viscosity solvents, 1 ml of the solvents set forth in Table IV colored with Eosine was added at room temperature to 50 ml of tetrahydrofuran and the time required for uniform spreading of the solvent in tetrahydrofuran was measured. The results are set forth in Table IV.

TABLE IV

| Added colored solvent | Viscosity of solvent (cp) | Time required for uniformly spreading (sec.) |
|---|---|---|
| 1,2,3,4-tetrahydronaphthalene | 2.0 | 390 |
| hexylbenzene | 2.1 | 300 |
| decalin | 2.4 | 370 |
| liquid paraffin | >5 | 420 |
| hexane | 0.29 | 70 |
| toluene | 0.55 | 60 |
| propylbenzene | 0.74 | 90 |
| cyclohexane | 0.90 | 160 |
| butylbenzene | 1.0 | 120 |

Having now fully described this invention, it will be apparent to one of ordinary skill in the art that many changes and modifications can be made thereto without departing from the spirit or scope of the invention set forth herein.

What is claimed as new and intended to be secured by Letters Patent is:

1. In the polymerization of an anionically polymerizable monomer using a polymerization system comprising a monomer and a polymerization solvent wherein an organometallic compound polymerization initiator, soluble in said polymerization system having the formula:

$$MeR_x$$

wherein Me is a metal selected from the group consisting of Groups I and II of the Periodic Test; R represents an alkyl or aryl group, or an aliphatic or aromatic hydrocarbon residue; and the integer x is 1 or 2; is added to said system, the improvement which comprises adding said polymerization initiator to said polymerization system as a solution comprising said polymerization initiator dissolved in a high viscosity solvent having a viscosity
greater than 1 cp at room temperature and which is at least one member selected from the group consisting of n-hexylbenzene, n-butylbenzene, decalin, 1,2,3,4-tetrahydronaphthalene, liquid paraffin, and a mixture of liquid paraffin and benzene, wherein polymerization is subsequently initiated as the initiator dissolves in said polymerization system.

2. The polymerization of claim 1, wherein said high viscosity solvent does not inhibit the anionic polymerization.

3. The polymerization of claim 1, wherein the high viscosity solvent is at least one member selected from the group consisting of hexylbenzene, decalin, 1,2,3,4-tetrahydronaphthalene, and liquid paraffin.

4. The polymerization of claim 1, wherein the monomer and the solvent for polymerization are purified by dehydrating with a dehydrating agent in vacuum or in an inert gas and then distilling the monomer or the solvent.

5. The polymerization of claim 1, wherein the solution of the organometallic compound is added dropwise to the polymerization system so as to first react with impurities contained in the polymerization system until initiation of the polymerization ensues.

6. The polymerization of claim 1, wherein the concentration of the organometallic compound is in the range of $10^1$–$10^{-7}$ mole/l and wherein the amount of the monomer in the polymerization system is in the range of 0.5–20 wt.%.

* * * * *